United States Patent
Funk et al.

(10) Patent No.: US 6,516,204 B1
(45) Date of Patent: Feb. 4, 2003

(54) COMBINATION INTERNAL MODEM AND PC CARD RADIO OPERABLE IN MULTIPLE MODES

(75) Inventors: Gregory John Funk, Delta (CA); Ronald John Vanderhelm, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 08/724,459

(22) Filed: Oct. 1, 1996

(51) Int. Cl.[7] .............................. H04B 1/03; H04B 1/08
(52) U.S. Cl. ...................... 455/557; 455/558; 455/575; 455/348; 455/351
(58) Field of Search ................... 455/557, 558, 455/556, 550, 575, 90, 128, 348, 351; 895/834

(56) References Cited

U.S. PATENT DOCUMENTS

| | | | | |
|---|---|---|---|---|
| 5,544,222 A | * | 8/1996 | Robinson et al. | 455/557 |
| 5,594,952 A | * | 1/1997 | Virtuoso et al. | 455/348 X |
| 5,621,363 A | * | 4/1997 | Ogden et al. | 455/90 X |
| 5,657,371 A | * | 8/1997 | Suomi et al. | 455/557 X |
| 5,701,515 A | * | 12/1997 | Gradeler | 395/834 |

FOREIGN PATENT DOCUMENTS

| | | |
|---|---|---|
| WO | WO 90/03076 | 3/1990 |
| WO | WO 94/29968 | 12/1994 |
| WO | 2 285 558 | 7/1995 |

* cited by examiner

*Primary Examiner*—Lee Nguyen
*Assistant Examiner*—Philip J. Sobutka
(74) *Attorney, Agent, or Firm*—Thelen Reid & Priest LLP; Robert E. Krebs (57) ABSTRACT

An inexpensive, PCMCIA-based radio transceiver is provided that interfaces to a separate baseband modem, which may itself be PCMCIA-based or may be an internal modem of a notebook computer. Together, the PCMCIA-based radio transceiver and the baseband modem realize a wireless modem. In order to miminize cost and increase versatility of the resulting wireless modem, the radio transceiver is a relatively unintelligent, protocol-agnostic, slave device that is controlled by commands issued by the baseband modem. The baseband modem may be a hardware modem or a software modem. In either case, the character of the baseband modem may be changed by downloading new software. The radio transceiver may also be exchanged for another within a family of radio transceivers, each of which customized for a particular radio standard. The result is an extremely flexible, extremely low-cost wireless modem solution.

1 Claim, 7 Drawing Sheets

GENERAL CONTROL - RESETS TO 0x00

| WDG RST | RST | WDOG | SLEEP | KEY MODE | ARM/ KEY | RXON | TXON |
|---|---|---|---|---|---|---|---|

FIG. 6

ADC-DAC SELECT - RESETS TO 0x00

|  | DAC 2 | DAC 1 | DAC 0 |  | ADC 2 | ADC 1 | ADC 0 |
|---|---|---|---|---|---|---|---|

FIG. 7

ADC-DAC DATA - RESETS TO UNDEFINED

| D7 | D6 | D5 | D4 | D3 | D2 | D1 | D0 |
|---|---|---|---|---|---|---|---|

FIG. 8

IOPORT DIRECTION - RESETS TO 0xFF

| D7 | D6 | D5 | D4 | D3 | D2 | D1 | D0 |
|---|---|---|---|---|---|---|---|

IOPORT DATA - RESETS TO 0x00

| D7 (SPARE) | EECS | LE | DPROCRST | BUSY | TXCTRL | TACTRL | RACTRL |
|---|---|---|---|---|---|---|---|

FIG. 11

STATUS MASK - RESETS TO 0x00

| ~BSYMSK | ~TXCMSK | ~RACMSK | ~TACMSK | BSYMSK | TXCMSK | RACMSK | TACMSK |
|---|---|---|---|---|---|---|---|

FIG. 12

RADIO STATUS

| | | | | | | TXKEY | LOCK |
|---|---|---|---|---|---|---|---|

FIG. 13

DATA WRITE OPERATION

| S | Address | W | A | Length (bits) | A | Data 1 | A | ... | Data N | A | P |
|---|---|---|---|---|---|---|---|---|---|---|---|

S = START CONDITION
P = STOP CONDITION
W = WRITE
R = READ
A = ACKNOWLEDGE

DATA READ OPERATION

| S | Address | W | A | Length (bits) | A | S | Address | R | A | Data 1 | A | ... | Data N | A | P |
|---|---|---|---|---|---|---|---|---|---|---|---|---|---|---|---|

FIG. 14

COMBINATION INTERNAL MODEM AND PC CARD RADIO OPERABLE IN MULTIPLE MODES

1. Field of the Invention

The present invention relates to wireless modems, particularly to wireless modems realized at least in part by a PCMCIA card, otherwise known as a PC Card™.

2. State of the Art

Integrated circuit cards, particularly cards conforming to the PCMCIA or PC Card™ standard, have become a mainstay of mobile computing. Devices of various descriptions are available in the PCMCIA format, including memory cards, modems, disk drives, etc. The development of mobile computing has resulting in an increased demand in particular for wireless modems.

PCMCIA cards come in different varieties including, in order of increasing thickness, Type I, Type II and Type III cards. Ideally, a wireless modem would be realized in the form of a PCMCIA card such as a Type II card and would fit entirely within a Type II package enclosure. To date, this goal has not been fully realized. Because of the significant transmit power requirements of a wireless modem, existing PCMCIA-based wireless modems are provided with a rather bulky battery enclosed within an extension to the standard Type II card. During stand-by operation, the battery is trickle charged in preparation for future transmission and its attendant high power requirements. During transmission, the extra power required by the wireless modem is drawn from the battery.

A different approach to realizing a wireless modem has been to leverage the investment in existing equipment by interfacing a separate radio transceiver to an existing PCMCIA baseband modem. In this approach, the radio is not PCMCIA-based, and is protocol-specific. That is, the radio implements a particular radio protocol such as AMPS, for example. The radio transceiver therefore cannot be used with other different radio protocols, such as CDPD, PCS, etc., since for each different standard, the radio transceiver is different.

Although the pace of innovation in telecommunications may well defy the notion of a common RF standard, the lack of a common standard results in higher costs to consumers. As demonstrated in the wired computer modem market, market penetration depends heavily on prices reaching a threshold level of affordability. Continued improvements are therefore needed in order to make radio data communications equipment widely affordable.

What is needed, then, is an improved PCMCIA-based wireless modem that achieves the competing dual objectives of versatility and low cost.

SUMMARY OF THE INVENTION

The present invention, generally speaking, provides for an inexpensive, PCMCIA-based radio transceiver that interfaces to a separate baseband modem, which may itself be PCMCIA-based or may be an internal modem of a notebook computer. Together, the PCMCIA-based radio transceiver and the baseband modem realize a wireless modem. In order to minimize cost and increase versatility of the resulting wireless modem, the radio transceiver is a relatively unintelligent, protocol-agnostic, slave device that is controlled by commands issued by the baseband modem. The baseband modem may be a hardware modem or a software modem. In either case, the character of the baseband modem may be changed by downloading new software. The radio transceiver may also be exchanged for another within a family of radio transceivers, each of which customized for a particular radio standard. The result is an extremely flexible, extremely low-cost wireless modem solution.

BRIEF DESCRIPTION OF THE DRAWING

The present invention may be further understood from the following description in conjunction with the appended drawing. In the drawing.

DETAILED DESCRIPTION OF THE PREFERRED EMBODIMENT

Figure 1:
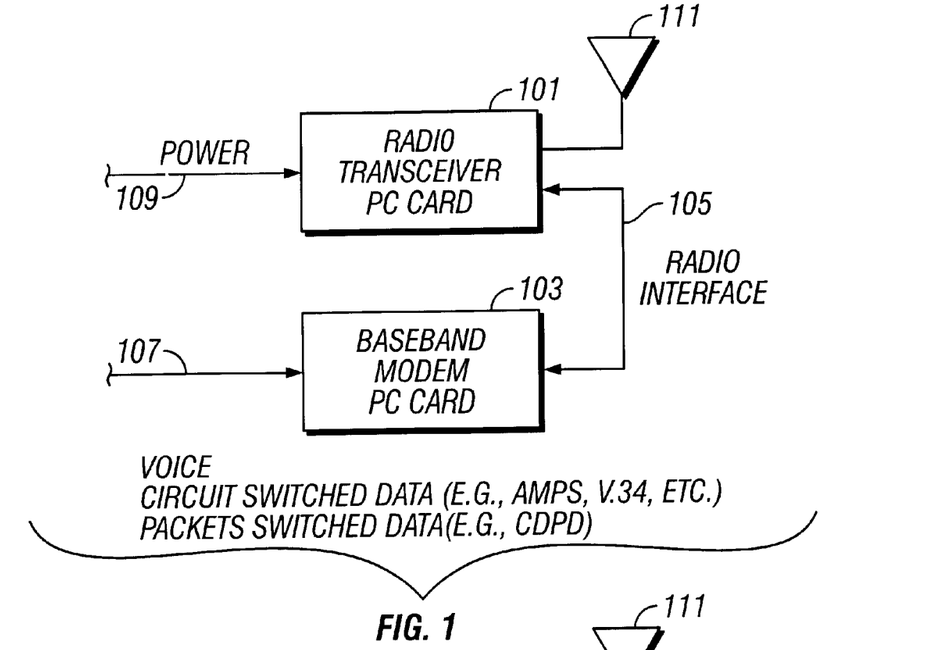
FIG. 1 is a diagram showing a radio transceiver incorporated within a first system configuration to realize a wireless modem.

Referring to FIG. 1, the overall architecture of the present wireless modem in a first embodiment thereof will be described. Both a radio 101 and a baseband modem 103 are realized as PC cards, e.g. PCMCIA cards. The PC cards are connected together through a radio interface 105 described in detail hereinafter.

The baseband modem PC card receives from a host computer (not shown) digital data through a card (e.g., PCMCIA) interface 107. The digital data may be circuit switched data (e.g., AMPS, V.34 or other wireline data, etc.) or packet switched data (e.g., CDPDL). The digital data may also represent an analog voice signal. The baseband modem 103 modulates the digital data and provides the resulting modulated signal to the radio transceiver 101 through the radio interface 105.

The radio transceiver PC card 101 is powered from a card (e.g., PCMCIA) interface 109. The radio transceiver 101 receives a modulation signal from the baseband modem PC card 103 and uses the signal to modulate an RF carrier. The modulated RF carrier is transmitted via an antenna 111.

Figure 2:
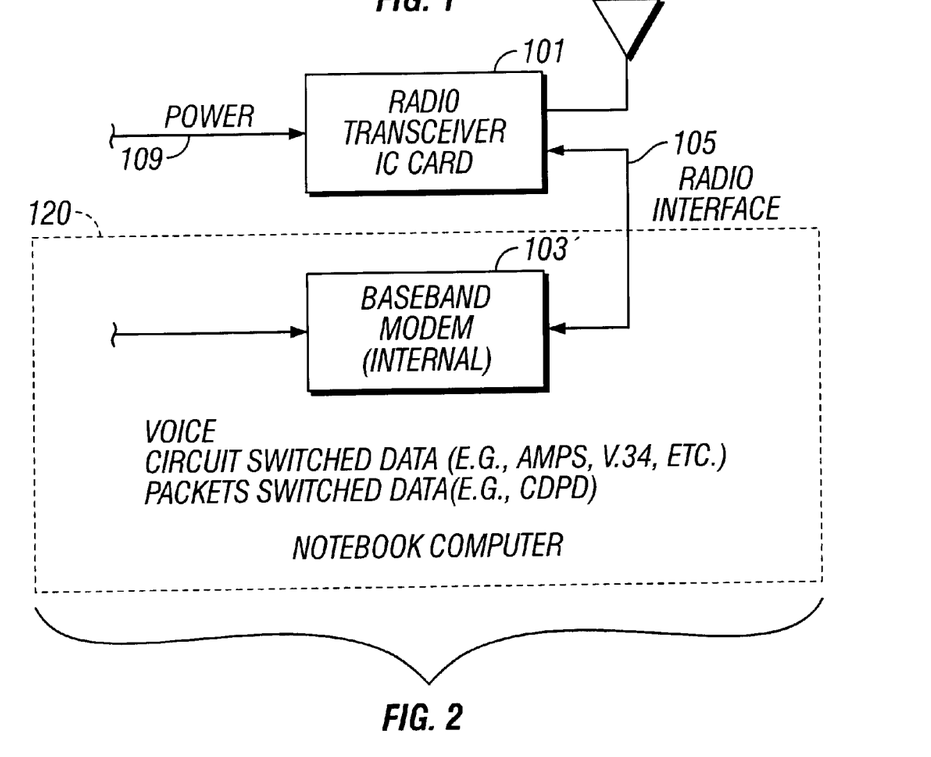
FIG. 2 is a block diagram showing the radio transceiver of FIG. 1 incorporated within a second system configuration to realize a wireless modem.

In FIG. 1, both the radio 101 and the baseband modem 103 are realized as PC cards. Referring now to FIG. 2, a similar arrangement is shown. Instead of the baseband modem being realized in the form of a PCMCIA card, however, the baseband modem 103' is an internal modem of a computer, e.g., a notebook computer 120 or the like. In other aspects, the wireless modems of FIG. 1 and FIG. 2 are substantially the same.

Figures 3, 3B:
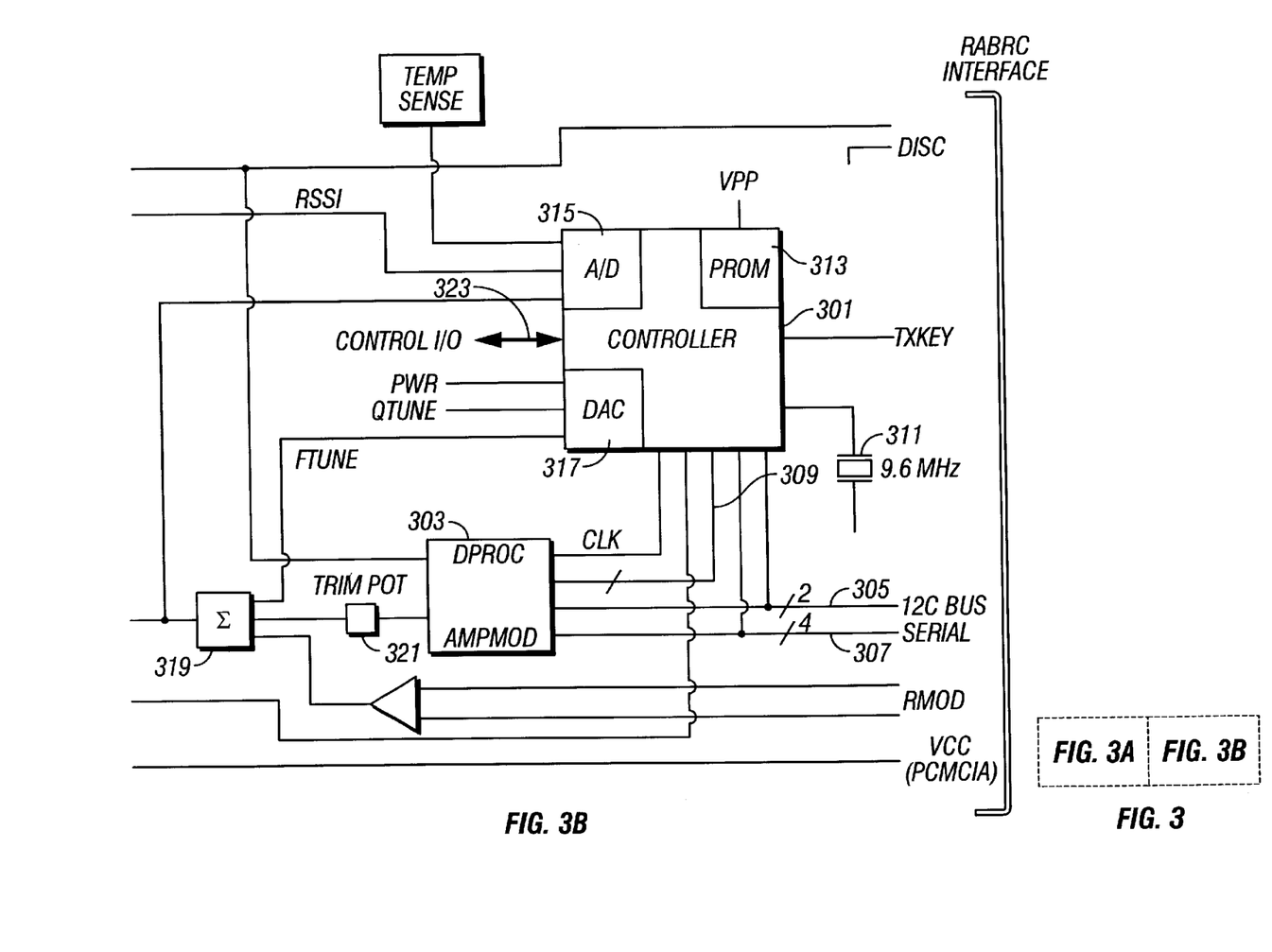
FIG. 3 is a block diagram of the radio transceiver of FIG. 1.
Figure 3A:
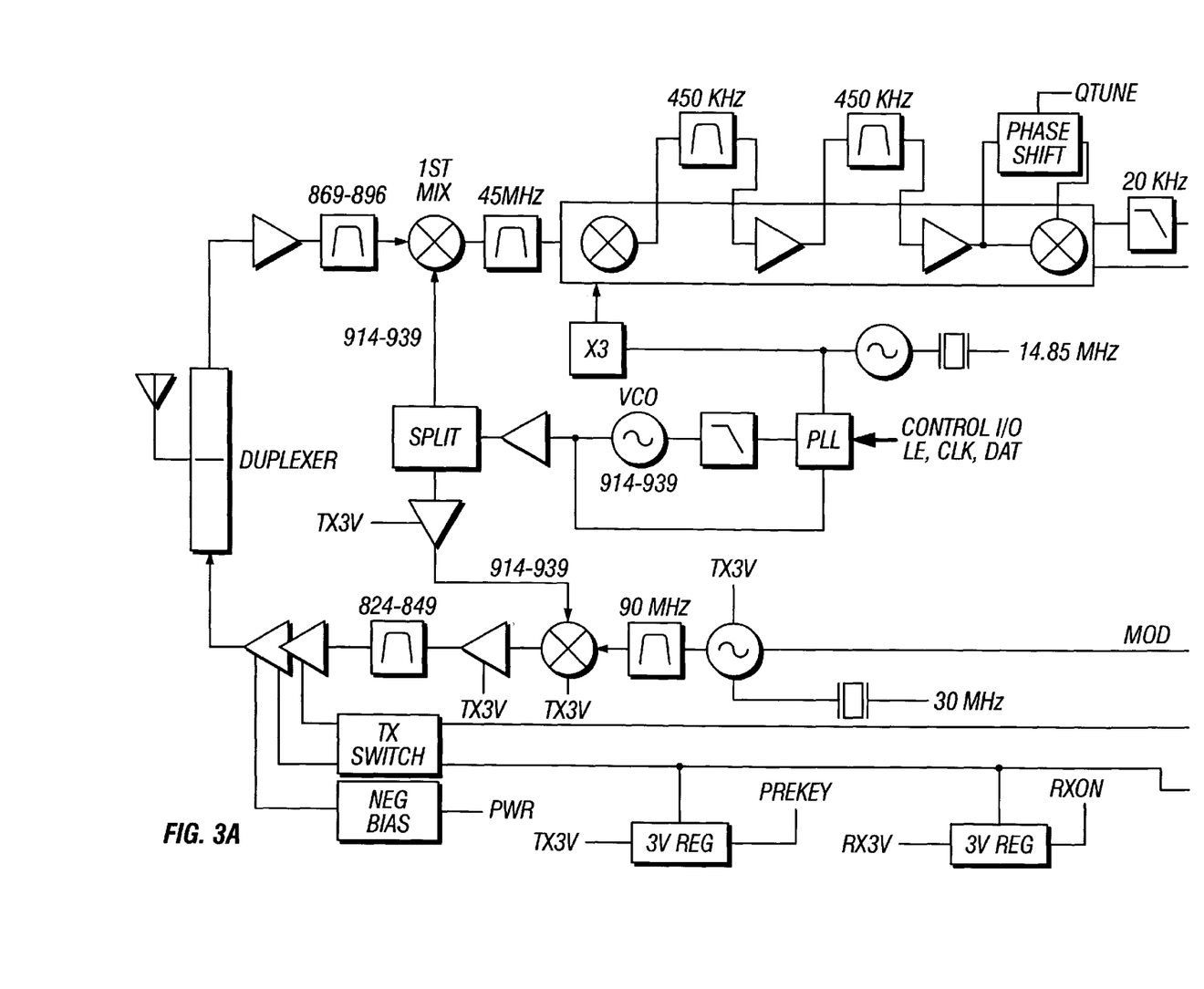

Referring to FIG. 3, the radio transceiver 101 of FIGS. 1 and 2 is shown in greater detail. Of particular interest is a control portion of the radio transceiver. This portion of the transceiver receives commands from the host computer through the radio interface to control operation of the radio. These commands are relatively low-level commands as described hereinafter.

The control portion of the radio transceiver consists primarily of a microcontroller 301 and a data processor for cellular radio (DPROC) 303 such as the UMA1002 available from Philips Semiconductors. The microcontroller 301, in general, exercises overall control of the radio transceiver and its functions. The DPROC 303, in general, implements functions specific to AMPS. When protocols other than AMPS are used, such as CDPD, the DPROC is idle.

Both the microcontroller and the DPROC are connected to two different buses, a two-wire I²C bus 305 and a four-wire serial bus 307. The microcontroller 301 provides a clock signal to the DPROC and exchanges various control signals with the DPROC on a bus 309. A clock signal for the microcontroller 301 is provided by an oscillator 311.

The microcontroller includes a PROM 313, an A/D converter 315, and a D/A converter (DAC) 317. The PROM 313 receives a programming voltage VPP from the PCMCIA interface or the like. The A/D converter 315 is used to determine the values of various analog signals including the following: a temperature signal produced by a temperature sensor, a Received Signal Strength Indicator (RSSI), and a modulation feedback signal (MOD). The D/A converter 317 is used to produce various tuning and control voltages including the following: a power control voltage PWR used to control the transmit power of the radio, a voltage QTUNE used to adjust the center frequency of the demodulator within a receive section of the radio, and an FTUNE signal used to fine tune the center frequency within a transmit section of the radio. The signal FTUNE is combined in a summer 319 with the modulation signal RMOD from the baseband modem and a signal "AMPMOD" from the DPROC. The latter signal is attenuated by a trim pot 321 set during factory calibration to give the proper transmit deviation.

Only the principal inputs and outputs of the microcontroller necessary to a full and complete understanding of the present invention have been discussed. Other signals are exchanged between the microcontroller 301 and various other components within the radio as represented by the bus CONTROL I/O 323. In addition, a transmit keying signal TXKEY is input to the microcontroller. The function of this signal is discussed in detail hereinafter.

The radio transceiver of FIG. 3 interfaces to a standard modem—either a modem PC Card or an internal modem—in a very similar fashion as a standard cellular phone in "Direct Connect" mode. 'Direct Connect' mode refers to the ability to connect directly from a modem to a cellular phone without the need for an intermediate interface box. Early modems had to connect to an interconnect box which performed whatever signal conditioning the phone required. Subsequently improvements resulted in building the appropriate hardware and software into the modem, facilitating a direct connection to the phone. Some of the functions normally performed within a cellular phone when that phone is being used for a data connection, however, are performed instead within the baseband modem. A specialized interface between the radio transceiver and the baseband modem is therefore required. The interface allows for AMPS data and voice communications and supports as well the CDPD protocol.

Figures 4, 4B:
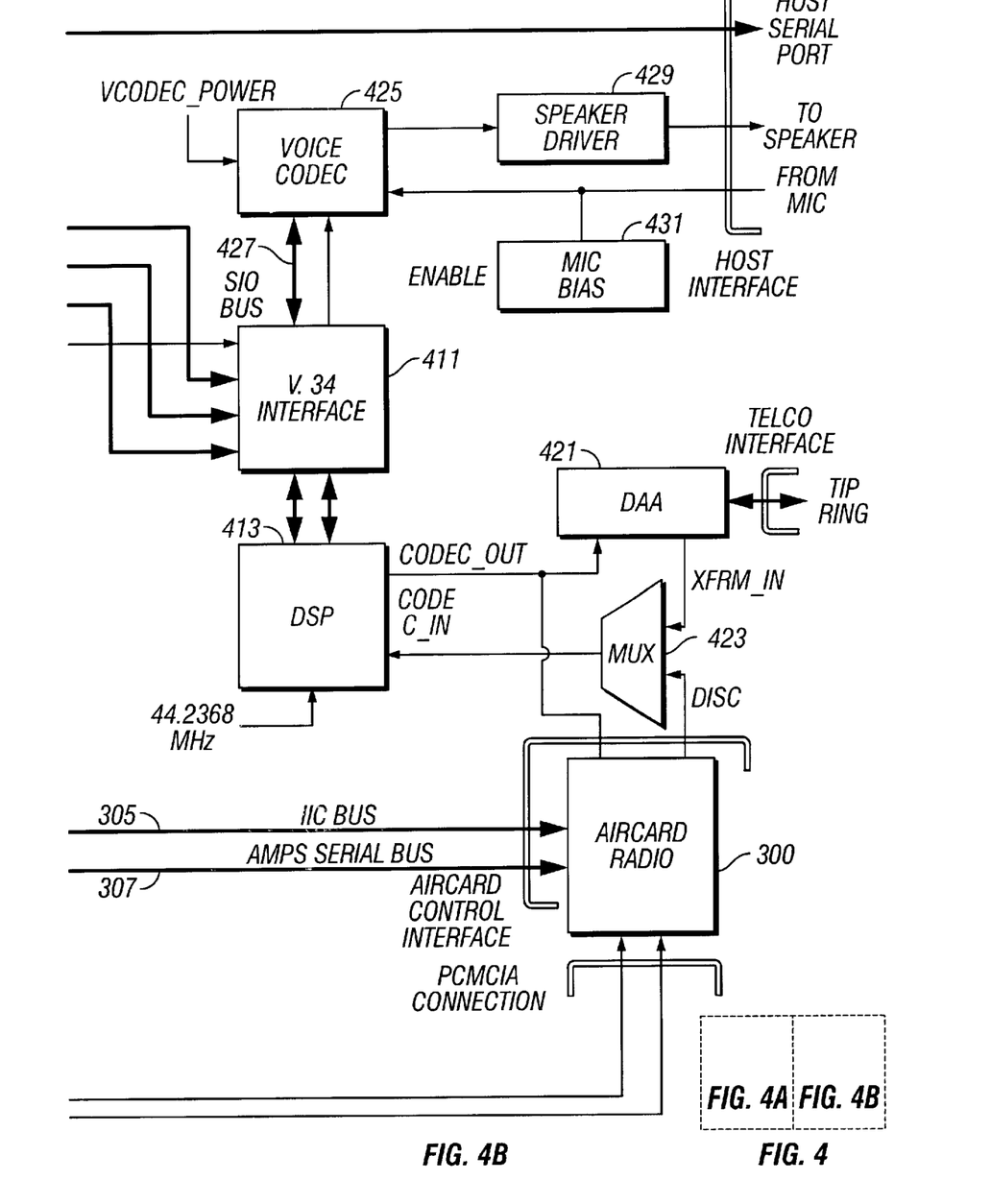
FIG. 4 is a block diagram of the baseband modem of FIG. 1.
Figure 4A:
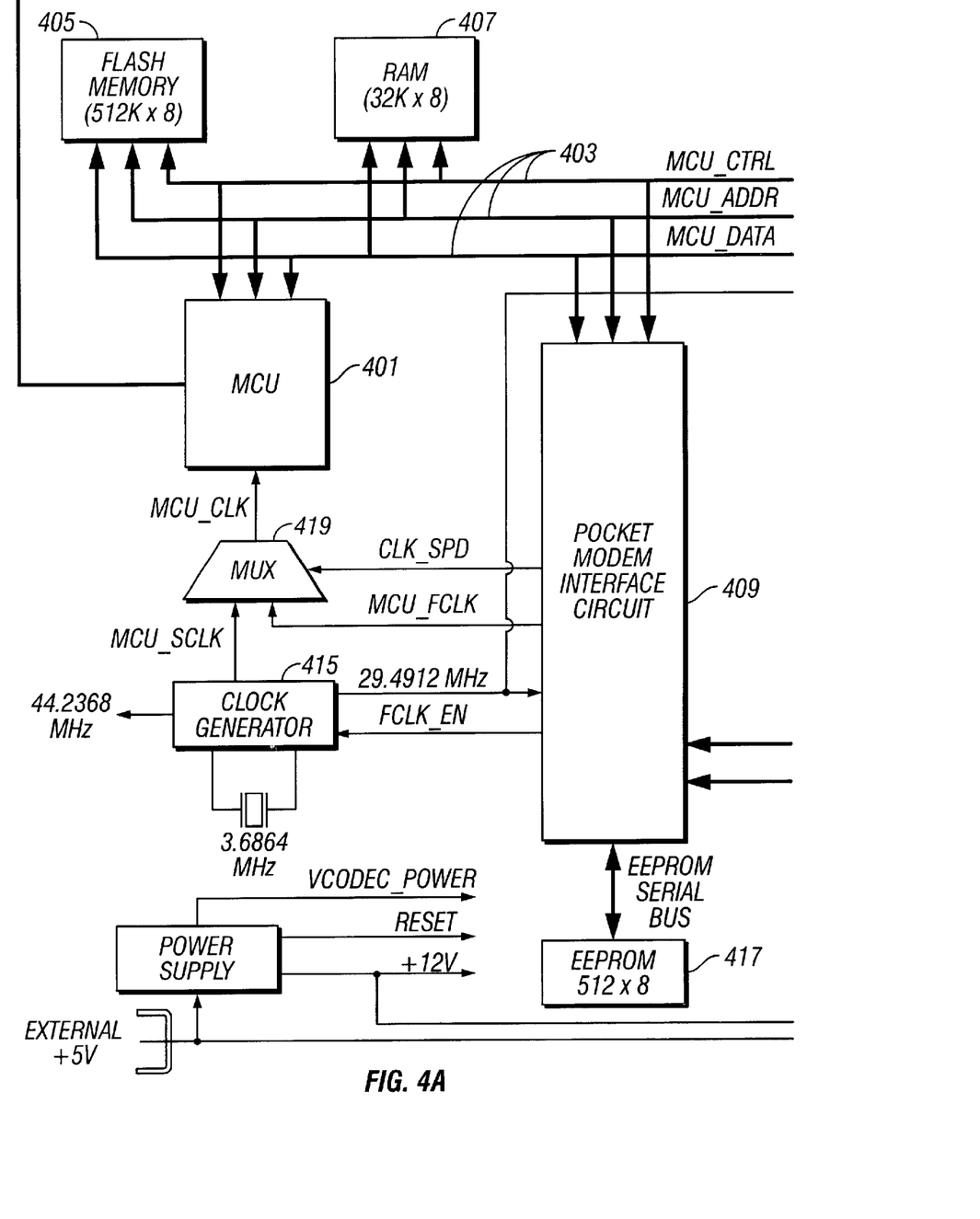

A block diagram of one possible modem architecture is shown in FIG. 4. A microprocessor control unit is connected to a bus 403 including control, address and data portions. Also connected to the bus 403 are flash memory 405, random-access memory 407, a pocket modem interface circuit 409 and a V.34 interface 411. The microprocessor control unit 401 exercises overall control of the modem, the pocket modem interface circuit 409 interfaces with the radio 300 via the buses 305 and 307 as previously described, and the V.34 interface 411 interfaces with a Dsp 411 to control modulation and demodulation of data.

A clock generator 415 provides a clock signal to the pocket modem interface circuit 409 and the V.34 interface 411. The pocket modem interface circuit 409 is connected to an EEPROM memory 417. The pocket modem interface circuit 409 controls the clock speed of the MCU using a multiplexer 419.

In the illustrated embodiment, the modem may be operated in either wireless mode or wired mode. Hence the DSP produces a CODEC-OUT signal that is connected to both the radio 300 and to a DAA (Data Access Arrangement) 421. The DAA 421 is coupled to the telephone interface. A CODEC-IN signal of the DAA 421 is received from either the DAA 421 or the radio 300 through a multiplexer 423.

The V.34 interface 411 includes voice capability. Digitized voice signals are therefore transmitted to and from voice codec 425 across a bus 427. The voice codec 425 is connected to a speaker driver 429 and to a microphone bias circuit 431.

The following components have been found to be suitable for use in modem of FIG. 4:

| Part | Mfgr. | Part No. |
| --- | --- | --- |
| Pocket Modem Interface Peripheral | Xilinx | XC3030A-70VQ100C |
| V.34 Interface ASIC | Lucent Tech. | VALV34-TQFP |
| Microprocessor control unit | Zilog | Z80182-16ASC |

The radio transceiver card obtains power (Vcc and Vpp) from the PCMCIA socket through a standard PCMCIA connector. A simple CIS (Card Information Structure) is included on the radio transceiver card to interface to Card and Socket Services software on the host computer. The CIS will, for example, enable Vpp at 12V.

Figure 5:
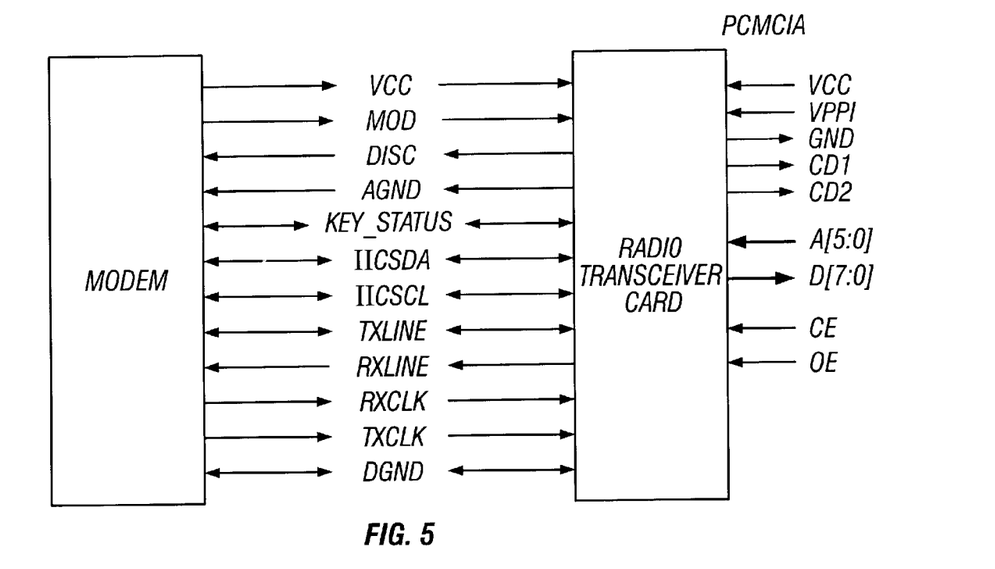
FIG. 5 is a block diagram showing details of the signalling interface between the radio transceiver of FIG. 3 and the baseband modem of FIG. 4.

A separate interface, to be presently described, is used for audio and control purposes. In accordance with one embodiment, a 12-pin connector is used for communication between the modem and the radio card. A block diagram specifying the signal lines comprising the interface is shown in FIG. 5. The function of each signal line is briefly described in the following table:

| | SIGNAL | FUNCTION |
| --- | --- | --- |
| ANALOG | MOD (Modulation) | The modulation input to the radio transmitter. |
| | DISC (Discriminator) | The discriminator output from the radio receiver. |
| | AGND (Analog Ground) | The ground reference for MOD and DISC. |
| CONTROL | IICSDA, IICSCL | Two-wire serial interface conforming to I²C specification. |
| | KEY_STATUS | Primarily used as a transmit key, TXKEY, signal. |
| DPROC DATA INTERFACE | RXLINE | Received AMPS control data. |
| | RXCLK | Clock for received data. |
| | TXLINE | Transmit AMPS control data and handshake. |
| | TXCLK | Clock for transmit data. |
| POWER | VCC | Power from modem (optional). May be used to power logic circuitry. |
| | DGND | Reference signal for digital signals. |

Logically, the modem/radio interface is designed around a set of registers. In a preferred embodiment, these registers are read/written using the I²C protocol. The register address may be embedded in the I²C address to minimize addressing overhead.

In an exemplary embodiment, there are 16 registers, eight of which are defined and eight of which are reserved for future use. The definition and function of each of the eight registers will be described in turn.

Figure 6:
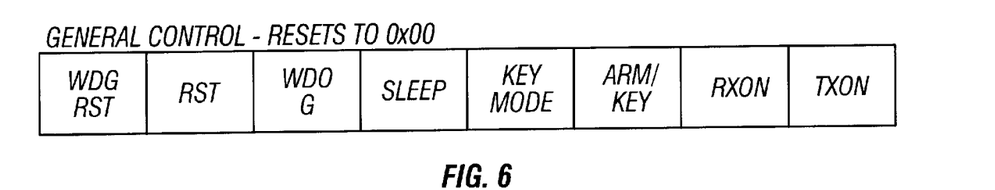
FIGS. 6–14 are diagrams of registers in an exemplary implementation of the interface of FIG. 5.

Referring to FIG. 6, register 0 is a general control register. The TXON bit turns on power to the radio transmitter stages when set to 1. RXON turns on power to the receiver. RXON must have been previously set before setting TXON.

In an exemplary embodiment, the radio is provided with two different keying modes. When the KEYMODE bit is set to 0, the ARM/KEY bit is configured to "arm" the transmitter. In this mode, the keying of the radio is controlled using the TXKEY interface line in FIG. 3 allowing for very accurate timing of the keying of the radio, as required for CDPD operation. When the KEYMODE bit is set to 1, the ARM/KEY bit actually keys the transmitter. In this mode, the keying of the radio is fully controlled through the I²C interface.

A Watchdog Timer is used to ensure that the radio does not inadvertently become stuck in an unknown state. Toggling the bit WDOG resets the Watchdog Timer. The Watchdog Timer should be reset at least once a second to avoid a reset of the radio. When the WDGRST bit is set, it indicates that a watchdog Reset has occurred.

Writing a 1 to the SLEEP bit places the radio transceiver into a sleep state. Wakeup is automatic when the radio is addressed on the I²C interface. Writing a 1 to the RST bit returns all registers to their Reset state.

Figure 7:
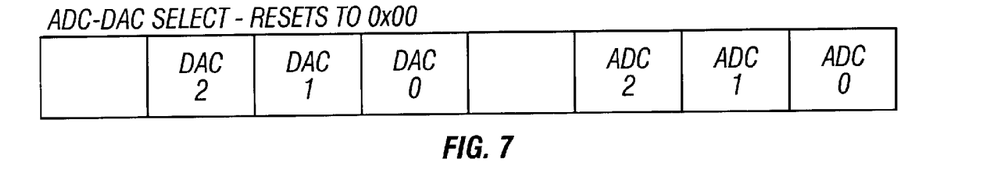
Figure 8:
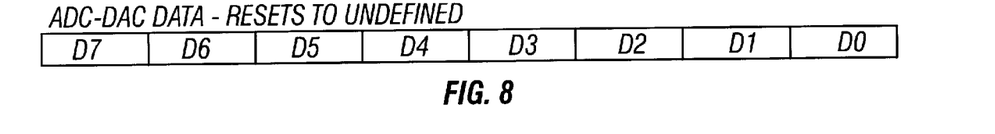

Referring to FIG. 7, the ADC/DAC Select register is used to select one of eight channels of the ADC of Figure, and one of eight channels of the DAC of FIG. 3. As seen in FIG. 3, inputs to the ADC include an RSSI signal, a temperature input, and a MOD loopback path. Outputs from the DAC include the PWR, QTUNE (discriminator tuning) and FTUNE (center frequency tuning) signals. Actual data for the ADC and the DAC is read from and written to an ADC/DAC Data register, shown in FIG. 8.

Figure 9:
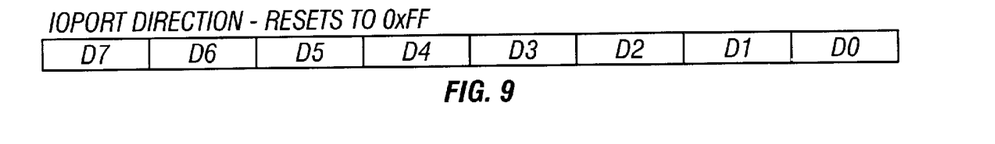

The controller in FIG. 3 is provided with a general-purpose, programmable I/O port. Eight I/O lines are provided for communication/control within the radio. Each of the I/O lines may be configured as an input or an output by setting or resetting the appropriate bits of the IOPORT Direction register of FIG. 9.

Figure 10:
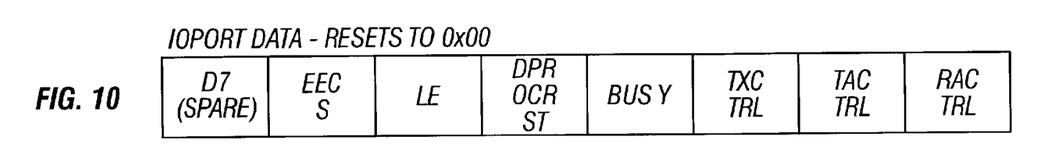

In an exemplary embodiment, various ones of the I/O lines are assigned functions as indicated in FIG. 10, showing the IOPORT Data register, and described in the following table:

| SIGNAL | IN/OUT | TO/FROM | FUNCTION |
|---|---|---|---|
| RACTRL | IN | FROM DPROC | Receive Audio Mute |
| TACTRL | IN | FROM DPROC | Transmit Audio Mute |
| TXCTRL | IN | FROM DPROC | Transmitter RF disable (indication of access failure) |
| BUSY | IN | FROM DPROC | Control Channel Busy/Idle |
| DPROCRST | OUT | TO DEPROC | Reset the DPROC |
| LE | OUT | TO Synthesizer | Latch enable for synthesizer programming |
| EECS | OUT | TO EEPROM | Chip Select for serial EEPROM |

Figure 11:
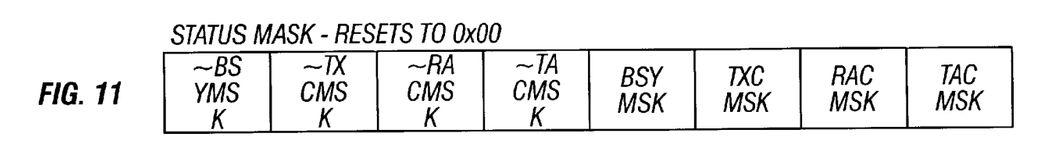

Status of the foregoing signals may be monitored on a status line in accordance with a status mask, shown in FIG. 11. The status line is the logical AND of all of the conditions which have their mask bits set.

Figure 12:
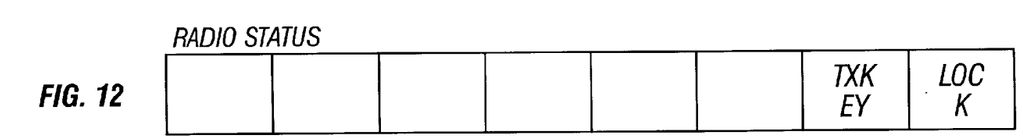

A Radio Status register is defined as shown in FIG. 12. A LOCK bit indicates whether or not the radio synthesizer is locked. A TXKEY bit indicates whether or not the Transmit Power Amplifier is keyed (turned on) or de-keyed (turned off).

Figure 13:
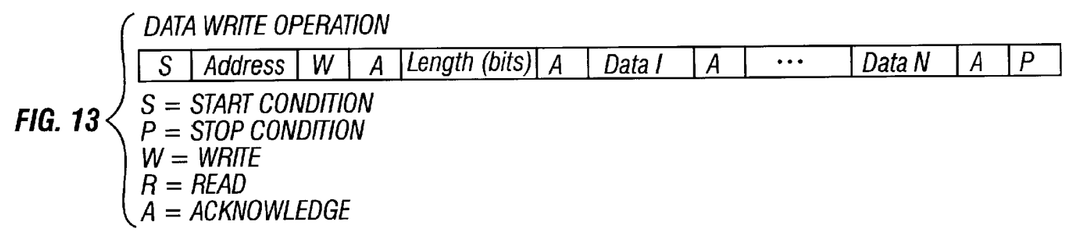
Figure 14:
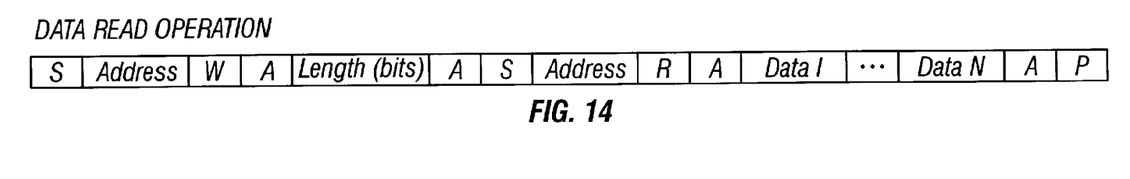

To optimize the speed of serial device access, the serial data interface is implemented as shown in FIGS. 13 and 14. Referring to FIG. 13, a data write operation begins with a Start bit S, followed by a series of address bits, followed by a Write bit W. The receiving device then acknowledges with an Acknowledge bit A. The sending device then sends a series of bits representing the length of the data to follow. The receiving device acknowledges. The sending device then sends a predetermined number of bits and waits for the receiver's acknowledgement. This sequence of events is repeated until the last quantum of bits has been sent and acknowledged. The sender then sends a Stop bit P.

A read operation is illustrated in FIG. 14. The first portion of a read operation is identical to that of a write operation, through sending of length and receipt of acknowledgement. The device responding to the read request then sends a Start bit S, followed by a series of address bits (corresponding to the requested starting address), followed by a Read bit R. The requesting device then acknowledges with an Acknowledge bit A. The device responding to the read request then sends a predetermined number of bits and waits for the requestor's acknowledgement. This sequence of events is repeated until the last quantum of bits has been sent and acknowledged. The device responding to the read request then sends a Stop bit P.

The construction of the radio transceiver of FIG. 3 makes it inexpensive and hence widely affordable. A family of inexpensive radios may be based on substantially the same platform, each radio using the same baseband modem. Hence a single user might well afford multiple radios corresponding to different wireless services. The radio design does, however, require relatively low-level commands to be issued from the baseband modem to control the radio. The following examples are provided of different command sequences used to perform common operations.

To turn on the radio and have it receive, host software issues the following sequence of commands:

Configure the IOPORT Data and Direction registers.

Set RXON high.

Wait roughly 100 us.

Read the QTUNE value from storage and write it into the DAC that drives the QTUNE line.

Program the synthesizer for the channel to be received, using the signals LE, CLK and DAT. The receiver will deliver a valid DISC signal after about 20 ms.

The synthesizer output is used as the first local oscillator within the received section of the radio transceiver. In the illustrated embodiment, the synthesizer is programmed to operate at the desired receive frequency plus 45.0 MHz. The frequency is reprogrammed for each new channel. More specifically, to load the synthesizer from scratch, two serial bits strings are loaded (a reference divider string and a variable divider string) as follows:

Set LE bit low.

Send the serial bit string using CLK and DAT.

Set LE bit high.

Set LE bit low.

With the receiver on and the synthesizer programmed to the correct channel, a transmit procedure may be started as follows:

Set KEYMODE as appropriate.

Turn on the transmitter exciter by asserting TXON.

Set DPROC_GAIN, FTUNE, TNET and DSP output amplitude values for the desired channel as appropriate based on calibration parameters.

Set the desired RF PWR value based on calibration parameters.

Wait 10 ms after turning on tXON to allow the exciter to stabilize.

When ready to transmit, key the radio in accordance with one of the following procedures.

At the end of transmission, de-key the radio.

Wait 1 ms.

De-assert TXON.

Keying is performed in accordance with either of two distinct mechanisms. The appropriate method is selected using the KEYMODE control bit. When KEYMODE=0, keying of the radio is controlled using the KEY_STATUS interface line, as follows:

Prekey a short time (e.g., 10 ms) before transmission by setting TXON, selecting KEYMODE =0, and setting the KEY/ARM bit. The KEY_STATUS line should be pulled low by the modem at this time as the radio become ready for transmission. The radio awaits a low to high transition on the KEY_STATUS line to key the power amplifier.

To key, the radio KEY_STATUS line is raised high when appropriate according to the medium access procedure. This transition is controlled directly by the modem DSP. At this point, in the case of CDPD, the packet preamble will be started. This will start the transmission.

To de-key, the KEY_STATUS line is lowered at the end of the packet, thus initiating the DEKEY process which involves ramping the power down.

A short time later the transmitter may be fully de-activated by clearing TXON.

When KEYMODE=1, keying of the radio is fully controlled through the $I_2C$ interface as follows:

Prekey by setting TXON, selecting KEYMODE=1, with KEY/ARM reset to 0.

Key by setting the KEY/ARM bit, thus enabling the power amplifier. The controller ensures that the data transmission starts when the power amplifier is at full power, accounting for the delay through the PC interface.

De-key by clearing the KEY/ARM bit, thus initiating the ramp-down procedure.

Fully de-activate the transmitter by clearing TXON.

By shifting control functions from the radio to the host computer, the cost of the radio may be significantly reduced. Inexpensive radio modules may be provided, tailored for different uses.

It will be appreciated by those of ordinary skill in the art that the invention can be embodied in other specific forms without departing from the spirit or essential character thereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A wireless modem comprising;

a radio transceiver having a first interface and a second interface; the second interface allowing the radio transceiver to be received within a PCMCIA slot;

a baseband modem having a first interface;

means for establishing communication between the radio transceiver through the first interface thereof and the baseband modem through the first interface; an wherein the radio transceiver receives only power through the second interface thereof.

\* \* \* \* \*